(12) United States Patent
Everingham et al.

(10) Patent No.: US 7,424,885 B2
(45) Date of Patent: Sep. 16, 2008

(54) INTEGRATED VAPOR CONTROL VALVE WITH FULL RANGE HYDROCARBON SENSOR

(75) Inventors: Gary M. Everingham, Chatham (CA); Craig Andrew Weldon, Chatham (CA); Andre Veinotte, Dresden (CA)

(73) Assignee: Continental Automotive Canada, Inc., Chatham, ON ( * ) Notice: Subject to any disclaimer, the term of this patent is extended or adjusted under 35 U.S.C. 154(b) by 212 days.

(21) Appl. No.: 11/063,988

(22) Filed: Feb. 24, 2005

(65) Prior Publication Data
US 2006/0185653 A1 Aug. 24, 2006

(51) Int. Cl.
*F02M 33/02* (2006.01)
*F02M 33/04* (2006.01)
(52) U.S. Cl. ...................... 123/520; 123/519
(58) Field of Classification Search ............ 123/520, 123/516, 518, 519, 494, 198 D; 60/283, 60/285; 73/118.1
See application file for complete search history.

(56) References Cited
U.S. PATENT DOCUMENTS

| | | | | |
|---|---|---|---|---|
| 4,703,737 A | * | 11/1987 | Cook et al. ................. | 123/520 |
| 4,763,634 A | * | 8/1988 | Morozumi ................... | 123/520 |
| 4,867,126 A | * | 9/1989 | Yonekawa et al. .......... | 123/520 |
| 5,249,561 A | * | 10/1993 | Thompson ................... | 123/520 |
| 5,373,822 A | * | 12/1994 | Thompson ................... | 123/520 |
| 5,636,621 A | | 6/1997 | Maki et al. | |
| 5,670,949 A | | 9/1997 | Kirby et al. | |
| 6,293,261 B1 | * | 9/2001 | Oemcke et al. ............. | 123/520 |
| 6,302,144 B1 | | 10/2001 | Graham et al. | |
| 6,326,228 B1 | | 12/2001 | Hughes et al. | |
| 6,659,087 B1 | | 12/2003 | Reddy | |
| 6,666,200 B2 | * | 12/2003 | Davis et al. ................. | 123/698 |
| 2002/0096150 A1 | * | 7/2002 | Perry et al. ................. | 123/519 |
| 2005/0016505 A1 | * | 1/2005 | Everingham et al. ........ | 123/520 |
| 2005/0044935 A1 | * | 3/2005 | Barrera et al. ............. | 73/118.1 |

* cited by examiner

*Primary Examiner*—Mahmoud Gimie

(57) ABSTRACT

An evaporative fuel vapor control system, purge valve and methods are described. The system includes a fuel supply, internal combustion engine, vapor canister, and a purge valve. The purge valve includes a sensor disposed in the body housing of the purge valve and in communication with the flow passage to provide a signal indicative of the magnitude of chemicals in the fuel vapor being provided to the engine. Various methodologies relating the system, purge valve and sensors are described.

23 Claims, 3 Drawing Sheets

INTEGRATED VAPOR CONTROL VALVE WITH FULL RANGE HYDROCARBON SENSOR

BACKGROUND OF THE INVENTION

Automobiles powered by an internal combustion engines not only emit pollutant emissions via combustion of fuel or via emission of lubricant or fuel in the crankcase, they also produce hydrocarbon emissions via evaporation of fuel stored in the automobiles. It is believed that approximately 20% of all hydrocarbon (HC) emissions from the automobile originate from evaporative sources. To reduce or eliminate this form of emission, modern automobiles store the fuel vapor in a canister and control its release from the canister into the combustion chamber for combustion. Such on-board evaporative emission control system (EVAP) typically includes a charcoal type vapor canister that collects vapor emitted from a fuel tank and a vapor control valve that regulates the amount of vapor permitted to be released from the canister to the engine. The EVAP system is designed to be fully enclosed so as to maintain stable fuel tank pressures without allowing fuel vapors to escape to the atmosphere.

Fuel vapor is generally created in the fuel tank as a result of evaporation. It is then transferred to the EVAP system charcoal canister when tank vapor pressures become excessive. When operating conditions can tolerate additional enrichment, these stored fuel vapors are purged into the intake manifold and added to the incoming air/fuel mixture. The EVAP system delivers these vapors to the intake manifold to be burned with the normal air/fuel mixture. This fuel vapor from the canister is added to the combustion chambers during periods of closed loop operation of the engine when the additional enrichment can be managed by the closed loop fuel control system.

It is believed that inaccurate control of the vapor control valve of the EVAP system may cause a rich air-fuel ratio and hence, driveability problems, as well as failure of the various idle speed tests or enhanced I/M evaporative pressure or purge test. That is, a determination of when to permit fuel vapor to be purged to the engine is believed to be problematic due to the wide variations in the volume of fuel vapors produced in the tank that arises from various factors such as, for example, ambient temperature, pressure, fuel mixture or the volume of fuel in the tank. Moreover, the concentration of hydrocarbons or other chemical constituents in fuel vapor may vary greatly depending on these factors and thus, the tail pipe emission can be outside of acceptable range. Also, the amount of latent energy stored in the fuel vapor may influence the driveability and exhaust emission of the vehicle. And inappropriate over or under purging of the vapor canister may reduce efficiency of the emission system.

It is believed that the prior art provides for a separate sensor in a purge line to determine the suitability of a purge cycle for a vapor purge valve. However, it is believed that such configuration has some drawbacks in that the attendant electrical connector and provisions must be made for separate wire connections with the sensor and purge valve actuator.

SUMMARY OF THE INVENTION

There is provided, in one aspect of the present invention, a fuel vapor control valve that alleviates the drawbacks discussed above. The fuel vapor control valve includes a body housing and a sensor. The body housing defines a flow passage between an inlet and an outlet. The body housing defines a main volume in selective fluid communication with at least one of the inlet and outlet. The sensor is disposed in the body housing and exposed to the main volume so that the sensor provides a signal indicative of a magnitude of chemicals present in the fuel vapor in the main volume.

In a further aspect of the invention, a fuel vapor control valve is provided. The fuel vapor control valve includes a body housing and a sensor. The body housing defines a flow passage between an inlet and an outlet. The body housing defines a main volume in selective fluid communication with at least one of the inlet and outlet. The sensor is disposed in the body and exposed to one of the inlet and outlet volumes so that the sensor provides a signal indicative of a magnitude of chemicals up to 100% by weight present in the fuel vapor in the main volume.

In yet another aspect, an evaporative fuel control system is provided. The system includes a fuel supply, internal combustion engine, vapor canister, and a vapor control valve. The fuel in the fuel supply generates vapor in the supply. The engine is supplied with fuel from the fuel supply. The internal combustion engine has respective intake and exhaust manifolds. The vapor canister includes a vapor passage disposed in selective fluid communication with the fuel supply to retain fuel vapor from the fuel supply and a purge passage disposed in selective fluid communication with one of the intake and exhaust manifolds to release fuel vapor to the engine. The vapor control valve disposed in the purge passage between the engine and the vapor canister. The vapor control valve has a body housing that surrounds a flow passage through the vapor control valve. The vapor control valve includes a sensor disposed in the body housing of the vapor control valve and in communication with the flow passage to provide a signal indicative of the magnitude of chemicals in the fuel vapor being provided to the engine.

In a further aspect of the invention, a method of determining the chemical content of a fuel vapor in a vapor control valve is provided. The vapor control valve has a body housing that surrounds a flow passage through the vapor control valve between an inlet and an outlet. The housing includes a main volume in selective fluid communication with an inlet volume and an outlet volume. The method can be achieved by supplying a first electrical current to provide a heat source for a sensor and a second electrical current to determine changes in resistance of a sensing element of the sensor located in at least one of the main, inlet, or outlet volumes; and sampling the fuel vapor present in the at least one of the main, inlet, or outlet volume to indicate a magnitude of chemicals present in the fuel vapor.

In yet another aspect of the invention, a method of controlling an evaporative fuel emission system is provided. The emission system includes a fuel supply coupled to an internal combustion engine via fuel injectors, a vapor canister and a vapor control valve. The internal combustion engine has respective intake and exhaust manifolds. The vapor canister has a vapor passage disposed in fluid communication with the fuel supply to retain fuel vapor from the fuel supply and a purge passage disposed in selective fluid communication with one of the intake and exhaust manifolds to release fuel vapor to the engine. The vapor control valve is disposed in the purge passage between the engine and the vapor canister. The vapor control valve has a housing that includes a main volume in selective fluid communication with an inlet volume and an outlet volume. The method can be achieved by supplying a first electrical current to provide a heat source for a sensor and a second electrical current to determine changes in resistance of a sensing element of the sensor located in at least one of the main, inlet, or outlet volumes; determining a chemical content of the fuel vapor in at least one of the main, inlet or outlet volumes based on at least one of the first and second electrical current; and controlling one of the vapor control valve and fuel injectors based on the determined chemical content.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENTS

Figure 1:
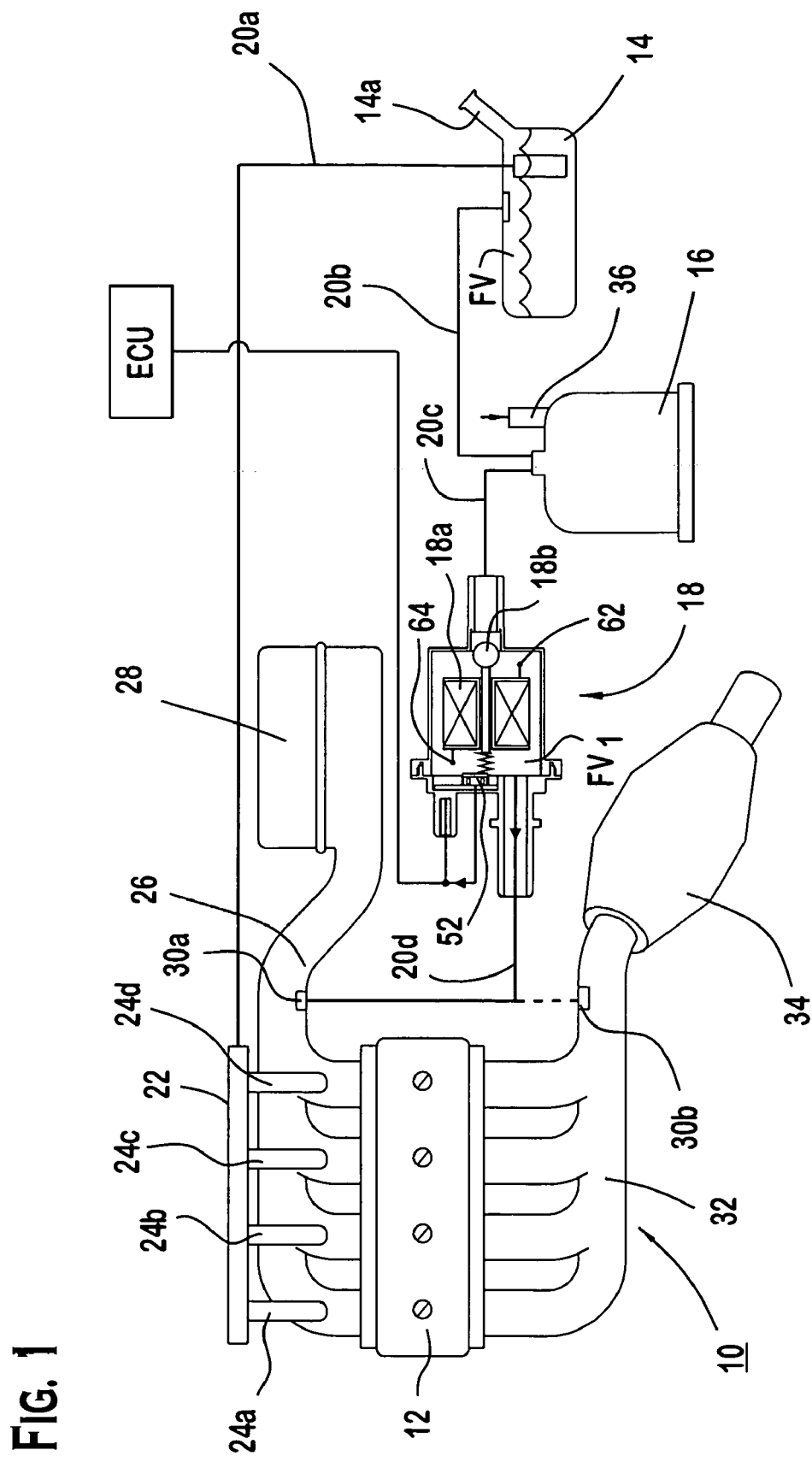
FIG. 1 illustrates a schematic form of a preferred evaporative emission system in a vehicle.
Figure 2:
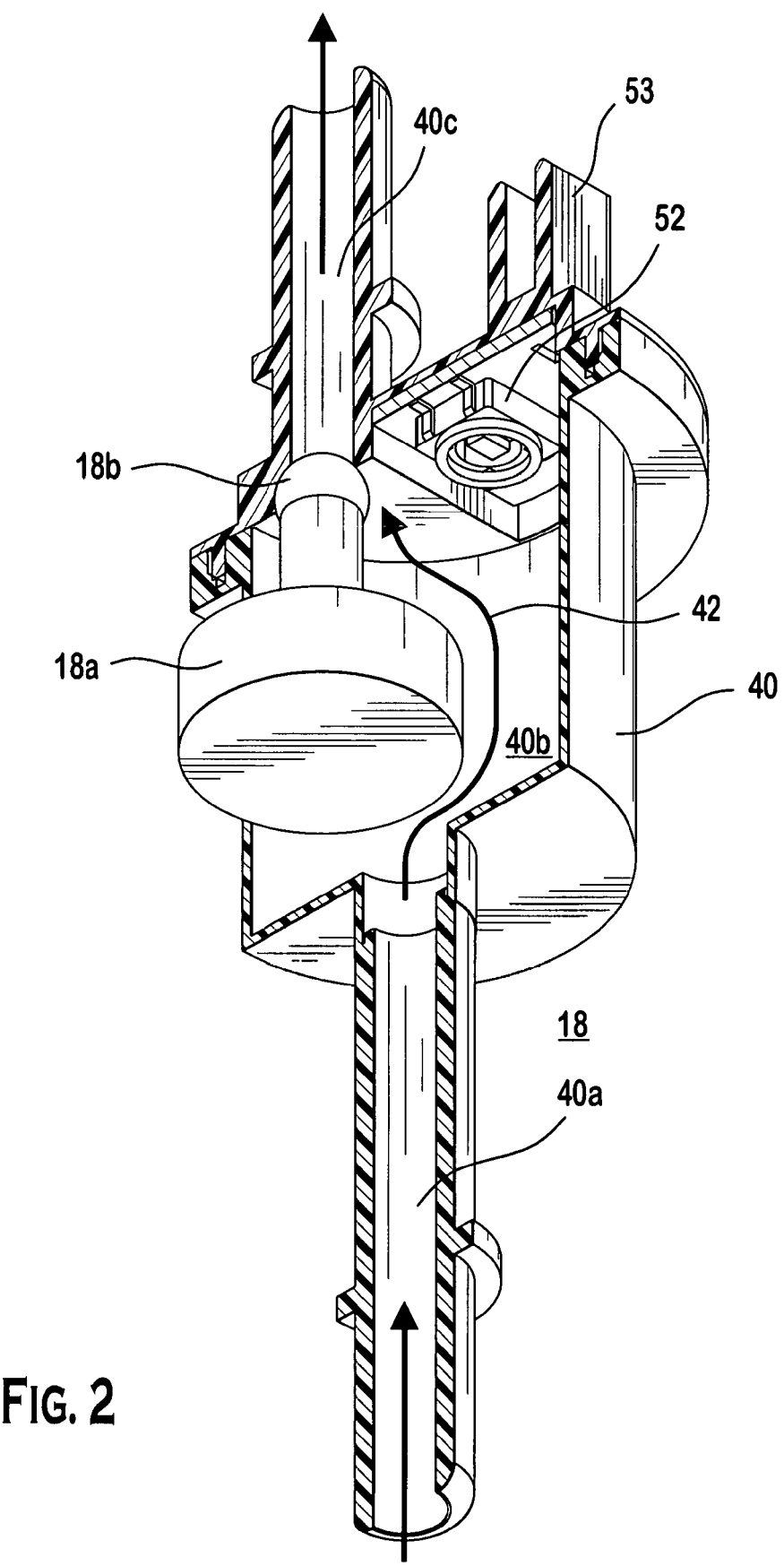
FIG. 2 illustrates a cut-way perspective view of the interior of the purge valve in a preferred embodiment.
Figure 3:
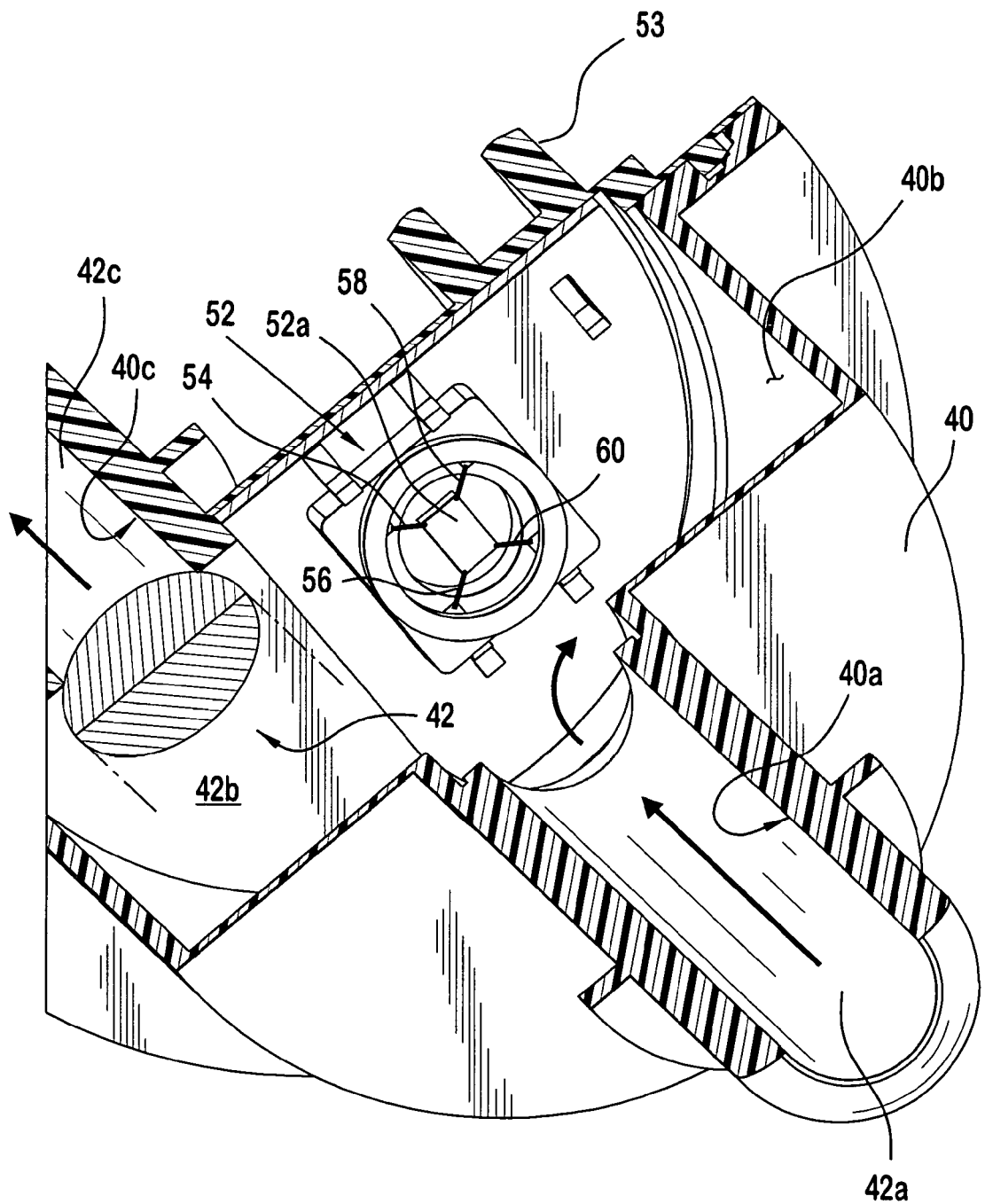
FIG. 3 is FIG. 2 rotated and enlarged to provide more detail of a representative sensor disposed in the interior of the preferred purge valve.

FIGS. 1-3 illustrate the preferred embodiments. Referring to FIG. 1, an evaporative fuel vapor control system 10 according to a preferred embodiment is shown. In particular, the system 10 includes an internal combustion engine 12, a fuel supply 14, a vapor canister 16 and a vapor control or purge valve 18.

The fuel supply 14 can be a suitable fuel tank 14a that stores fuel and vapors formed or generated in the fuel tank 14a. The internal combustion engine 12 can be supplied with fuel from the fuel supply 14 via suitable fuel supply conduits 20a to a fuel rail 22 for injection into the engine 12 by respective fuel injectors 24a, 24b, 24c, 24d. Although not shown, a fuel tank isolation valve can be utilized between the vapor canister 16 and the fuel supply 14.

The internal combustion engine 12 includes an intake manifold 26 in which the fuel injector outlets are mounted therein to dispense fuel into the intake manifold 26. Alternatively, high-pressure, direct injection fuel injectors can be mounted directly to the cylinder head of the engine 12 in pressure direct injection applications. The intake manifold 26 is coupled to an intake air box 28 that provides filtered air for combustion by the engine 12. A purge port 30a can be provided on the intake manifold 26 so that fuel vapors from the fuel tank 14a can be drawn by vacuum to the intake manifold 26 for combustion. Alternatively, a suitable delivery system can be provided for port 30b through the exhaust manifold 32 so that fuel vapors can be used to achieve a light-off temperature for faster catalyst action in a close-coupled catalytic converter 34. The engine 12 includes an exhaust manifold 32 coupled to an exhaust catalytic converter 34.

The vapor canister 16 includes a vapor passage 20b disposed in fluid communication with the fuel supply 14 to retain fuel vapor from the fuel supply 14. The vapor canister 16 includes a purge passage 20d disposed in selective fluid communication with one of the intake manifold 26 and exhaust manifold 32 to release fuel vapor to the engine 12 via the purge valve. A fresh air vent or inlet 36 is provided to replace the volume of fuel vapor being purged into the engine 12. The purge valve 18 is disposed in the purge passage 20d between the intake manifold 26 and the vapor canister 16. Preferably, the vapor canister 16 is a charcoal type canister with a fresh air inlet 36.

Referring to FIG. 2, the purge valve 18 includes a body housing 40 that surrounds a flow passage 42 extending through the purge valve 18. The body housing 40 of the purge valve 18 includes an inlet portion 40a, main body portion 40b, and outlet portion 40c that define the flow passage 42 between the inlet portion 40a and outlet portion 40c. The inlet portion 40a can be coupled to a fuel vapor canister 16 via pipe 20c, and the outlet portion 40c can be coupled to one of the intake manifold 26 of the engine 12 via pipe 20d. The inlet portion 40a defines a preset inlet volume; the main body portion 40b defines a preset main volume; and the outlet portion 40c defines a preset outlet volume.

The body housing 40 can include an actuator, preferably an electromagnetic actuator 18a with a closure member 18b that permits flow of fuel vapor to the engine 12 in a first position and prevents a flow of fuel vapor to the engine 12 in a second position of the closure member 18b. In this embodiment, the engine intake vacuum is applied to the closure member 18b. Although the closure member 18b is shown in FIG. 1 as occluding the inlet 40a, the closure member 18b can be disposed for occluding the outlet 40c, as shown in FIGS. 2 and 3.

The purge valve 18 of the preferred embodiment includes a sensor 52 disposed in at least one of the inlet, outlet, or main volumes of the purge valve 18 and in communication with the flow passage 42 that includes inlet passage 42a, body passage 42b, and outlet passage 42c. Preferably, the sensor 52 is located in a portion of the purge valve 18 that is in constant fluid communication with the outlet of the vapor canister 16. The sensor 52, illustrated in simplified schematic form in FIGS. 2 and 3, can provide a signal indicative of the magnitude of chemicals in the fuel vapor being provided to the engine 12. The sensor 52 can be a semiconductor sensor connected to an electrical connector 53, which can also be used to connect an emission control unit ("ECU") to a suitable actuator for the closure member of the purge valve 18.

One example of suitable sensors includes a sensor 52 that responds to changes in the content of reducing or oxidizing chemicals and requires elevated temperatures proximate a sensing element 52a to induce a reaction of chemical vapors to change the electrical resistance of sensing element 52a such as, for example, platinum. The sensing element 52a can be configured to operate at high levels, e.g., 95% by weight, of chemicals. Preferably, the chemicals can be hydrocarbons such as, for example, Butane, Hexane, Hexene, Benzene, Toluene, Dimethyl Pentane, Iso-Octane, Ethyl-Benzene, O-Xylene, Nonane or MTBE. More preferably, the chemicals sensed are Butane and Pentane present in the fuel vapor.

The sensing element 52a can be formed in any suitable configuration such as, for example, a planar configuration, shown here in FIG. 3. In such configuration, the sensing element 52a is mounted on a ceramic substrate. A first group of electrical terminals 54 and 56 can be used to energize the heating element with a first electrical current. A second group of electrical terminals 58 and 60 can be provided so that a second current can be supplied to the terminals 58 and 60. Hence, a change in the electrical resistance ΔR of the sensing element 52a can be determined in relation to the change in the second electrical current Δi. When the sensing element 52a is heated via first terminals 54 and 56 in the presence of oxidizable or reducible chemicals, the electrical resistance to the flow of the electrons across terminals 58 and 60 is increased or decreased (depending on the types of chemical), which can be measured to reflect the concentration level of chemicals in the fuel vapor. In the preferred embodiment, the first electrical current is a generally constant electrical current supplied to the sensor when the engine is operating. All four terminals can be connected to a pair of connecting wires with a switching arrangement so that a single current can be used to provide the heat source and sensing the change in electrical resistance of the sensing element 52a or two discrete currents can be supplied to provide the respective heat source and sense the change in resistance in the sensing element 52a.

The terminals 58 and 60 can be suitably interconnected with the purge valve, fuel pump, fuel injectors, air pump and other actuated devices such that the change in electrical current $\Delta i$ can be utilized by the vehicle control unit ECU via a suitable connection such as, for example, a direct connection or via a network 80 based on a suitable interconnected master-slave network protocol (e.g., Controller-Area-Network, a Local-Interconnect-Network, Time-Triggered Protocol for Class A applications). Alternatively, the output from sensor 52 can be configured, as appropriate, to provide a control signal for pulse-width or frequency modulation of the purge valve 18 or other vehicle emission related devices such as, for example, the fuel injectors, fuel pump, fuel pressure regulator and ignition system.

The terminals 54, 56, 58, and 60 are preferably integrated with the terminals 62 and 64 of the electromagnetic actuator 18a into a single electrical connector. Alternatively, both the actuator 18a and the sensor 52 can be connected to the ECU by a single wire in the single connector via a multiplexing arrangement. By combining all of the electrical connections for the sensor and solenoid into a single electrical connector, it is believed the drawbacks of the conventional purge valve have been alleviated and that several advantages have also been achieved: (1) a stable air-to-fuel ratio due to the ability to determine a concentration of fuel vapor being added into the engine 12; (2) a reduction of hydrocarbons being emitted in the engine exhaust due to intermittent fuel vapor being purged into the engine 12; and (3) a reduction in engine stumble due to a spike in air-to-fuel ratio while hydrocarbon vapor is being purged. Additionally, where port 30b is utilized, it is believed that a reduction in cold-start emission by purging an appropriate concentration of fuel into the exhaust manifold 32 so that catalytic light-off of the catalytic converter 34 can be achieved before the engine 12 is fully warmed up to operating temperatures.

Signal conditioning circuits can also be preferably provided on the housing of the sensor 52 to condition the output of the sensor to a suitable voltage level such as, for example, 0 to 5 Volts (digital or analog) that corresponds to chemical concentration level detected by the sensor element 52b. Where signal-conditioning circuits are utilized, the circuits are preferably sealed from contamination with the fuel vapor present in the purge valve. It should be noted, however, that the sensor 52 can be any sensor having the capability to detect the concentration of hydrocarbons such as, for example $C_3H_8$, from about 0% to 100% in a fuel vapor environment with an accuracy of ±3% and the ability to provide about 0.04 volt output per approximately 2% increase in hydrocarbons with a calibrated fuel vapor volume within about 300 milliseconds over operating temperatures ranging from −40 degrees Celsius to 150 degrees Celsius. Preferably, the sensor 52 is a semi-conductor sensor manufactured by Umweltsensortechnik GmbH Geschwenda of Germany having model number 81020000 disposed in the main volume 40b of the purge valve 18 (FIGS. 1-3).

In operation, fuel vapor FV is generated in the fuel supply 14 due to various conditions such as the ambient temperature, sloshing, vibration, barometric pressure, or the volatility characteristics of the fuel. Build up of fuel vapor FV in a headspace of the fuel supply 14 forces the fuel vapor FV to flow toward the vapor canister 16 via vent conduit 20b. The vapor canister 16 retains the fuel vapor so that the fuel vapor is not released to the atmosphere. As the vapor canister 16 retains more and more of the fuel vapor, it must maximize a purging of the stored vapors during the operation of the engine 12. To determine the appropriate conditions at which to purge the vapor canister 16 without affecting the drivability or controllability of the engine 12, the vehicle control computer ECU can sense, via the sensor 52, the concentration of various chemicals (e.g., hydrocarbons) in the fuel vapor and determine whether to purge via purge passage 20d and if the canister should be purged, the duration of the purging of the fuel vapor into the engine intake.

By virtue of the advantages described above, various methodologies relating to evaporative emission control can be achieved. In particular, a method to determine the chemical content of the fuel vapor FV1 in the purge valve 18 is provided. The method can be achieved by supplying a first electrical current and a second electrical current to the sensor 52 located in at least one of the inlet, body, and outlet volumes 40a, 40b, and 40c that provide respective inlet passage 42a, body passage 42b, and outlet passage 42c; and sampling the fuel vapor present in the at least one of the inlet, body, and outlet volumes 40a, 40b, and 40c to indicate a magnitude of chemicals such as, for example, hydrocarbons present in the fuel vapor FV or FV1.

Further, a method of controlling an evaporative fuel emission system is also provided. The method can be achieved by supplying a first electrical current and a second electrical current to a sensor located in at least one of the main, inlet, or outlet volumes 40b, 40a, 40c; determining a chemical content of the fuel vapor in at least one of the main, inlet or outlet volumes 40b, 40a, 40c based on at least one of the first and second electrical currents; and controlling one of the vapor control valve and fuel injectors based on the determined chemical content. The step of controlling the purging can also include preventing a flow of fuel vapor from the main volume to the outlet volume via a closure member 18b of the purge valve 18 while the sensor 52 determines the chemical content of the fuel vapor FV1 in the main volume 40b of the body 40. The step of controlling can also include flowing the fuel vapor FV1 to one of the intake and exhaust manifolds 26 or 32 as a function of the magnitude of the chemical content sensed by the sensor 52. Preferably, the sensor 52 is located in the main volume 40b of the body 40 of the purge valve 18.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What we claim is:

1. A fuel vapor control valve comprising:
   a body housing defining a flow passage between an inlet and an outlet, the body housing defining a main volume in selective fluid communication with at least one of the inlet and outlet;
   a sensor disposed in the body housing and exposed to the main volume so that the sensor provides a signal indicative of a magnitude of hydrocarbon chemicals present in the fuel vapor in the main volume, and
   an electromagnetic actuator in the body housing and constructed and arranged to control flow of fuel vapor through the flow passage in response to the signal from the sensor.

2. The fuel vapor control valve of claim 1, wherein the sensor comprises a sensor surface connected to first electrical terminals that provide a heat source and second electrical terminals that indicate a change in electrical resistance across the second electrical terminals in the presence of hydrocarbons.

3. The fuel vapor control valve of claim 1, wherein the sensor comprises a semiconductor sensor that provides a signal corresponding generally linearly to the amount of hydrocarbons from 0 to 100% by weight of the fuel vapor with an accuracy of ±3%.

4. The fuel vapor control valve of claim 1, wherein the sensor comprises a semiconductor sensor that provides a signal corresponding generally linearly to the amount of hydrocarbons up to approximately 100% by weight of the fuel vapor.

5. The fuel vapor control valve of claim 4, wherein the semiconductor sensor comprises an output unit that provides voltage signals varying from 0 to 5 volts.

6. The fuel vapor control valve of claim 5, wherein the semiconductor sensor is accurate to of ±3% with a calibrated fuel vapor volume.

7. The fuel vapor control valve of claim 5, wherein the semiconductor sensor responds to changes in the magnitude of hydrocarbons in the fuel vapor within about 300 milliseconds.

8. The fuel vapor control valve of claim 5, wherein the semiconductor is accurate to of ±3% with a calibrated fuel vapor volume between −40 degrees Celsius to 150 degrees Celsius and the hydrocarbons are selected from a group comprising Butane, Hexane, Hexene, Benzene, Toluene, Dimethyl Pentane, Iso-Octane, Ethyl-Benzene, O-Xylene, Nonane, MTBE, and combinations thereof.

9. The fuel vapor control valve of claim 6, wherein the actuator includes a closure member that regulates a flow of fuel vapor to the main volume or a flow of fuel vapor from the flow passage to an engine intake.

10. A fuel vapor control valve comprising:
a body housing defining a flow passage between an inlet and an outlet, the body housing defining a main volume in selective fluid communication with at least one of the inlet and outlet, the inlet defining an inlet volume and the outlet defining an outlet volume;
a sensor disposed in the body and exposed to one of the inlet and outlet volumes so that the sensor provides a signal indicative of a magnitude of hydrocarbon chemicals up to 100% by weight present in the fuel vapor in the main volume, and
an electromagnetic actuator in the body housing and constructed and arranged to control flow of fuel vapor through the flow passage in response to the signal from the sensor.

11. The fuel vapor control valve of claim 10, wherein the sensor comprises a semiconductor accurate to of ±3% with a calibrated fuel vapor volume and responds to changes in the magnitude of hydrocarbons in the fuel vapor within about 300 milliseconds between −40 degrees Celsius to 150 degrees Celsius, the sensor including an output unit that provides voltage signals varying from 0 to 5 volts.

12. An evaporative fuel vapor control system comprising:
a fuel supply having fuel that generates fuel vapor in the supply;
an internal combustion engine being supplied with fuel from the fuel supply, the internal combustion engine having respective intake and exhaust manifolds;
a vapor canister having a vapor passage disposed in fluid communication with the fuel supply to retain fuel vapor from the fuel supply and having a purge passage disposed in selective fluid communication with one of the intake and exhaust manifolds to release fuel vapor to the engine;
a vapor control valve disposed in the purge passage between the engine and the vapor canister, the vapor control valve having a body housing that defines a main volume of the vapor control valve, the vapor control valve including a sensor exposed to the main volume to provide a signal indicative of the magnitude of hydrocarbon chemicals in the fuel vapor present in the main volume, and the vapor control valve including an electromagnetic actuator in the body housing and constructed and arranged to control flow of fuel vapor from the purge passage in response to the signal from the sensor.

13. The system of claim 12, wherein the sensor comprises a sensor surface connected to first electrical terminals that provide a heat source and second electrical terminals that indicate a change in electrical resistance across the second electrical terminals in the presence of hydrocarbons.

14. The system of claim 13, wherein the body housing of the vapor control valve comprises: an inlet and an outlet that define a flow passage, the inlet being in fluid communication to a fuel vapor canister, and the outlet being in fluid communication with one of the intake or exhaust manifold of the engine.

15. The system of claim 14, wherein the actuator includes a closure member that permits flow of fuel vapor to the engine in a first position and prevents a flow of fuel vapor to the engine in a second position of the closure member.

16. A method of determining chemical content of fuel vapor in a vapor control valve having a body housing that surrounds a flow passage through the vapor control valve between an inlet and an outlet, the housing including a main volume in selective fluid communication with an inlet volume and an outlet volume, the method comprising:
supplying a first electrical current to provide a heat source for a sensor and a second electrical current to determine changes in resistance of a sensing element of the sensor located in at least one of the main, inlet, or outlet volumes;
sampling the fuel vapor present in the at least one of the main, inlet, or outlet volumes to indicate a magnitude of hydrocarbon chemicals present in the fuel; and
actuating an electromagnetic actuator disposed in the body housing of the vapor control valve to control flow of fuel vapor through the flow passage in response to the sampling step.

17. The method of claim 16, wherein the sampling comprises mounting the sensor in the main volume.

18. The method of claim 16, wherein the supplying comprises sensing a change in electrical resistance to the flow of one of the first or second electrical currents in the presence of hydrocarbons.

19. The method of claim 17, wherein the sampling comprises providing one of an analog or digital output signal.

20. A method of controlling an evaporative fuel emission system having a fuel supply coupled to an internal combustion engine via fuel injectors, the internal combustion engine having respective intake and exhaust manifolds, a vapor canister having a vapor passage disposed in fluid communication with the fuel supply to retain fuel vapor from the fuel supply and having a purge passage disposed in selective fluid communication with one of the intake and exhaust manifolds to release fuel vapor to the engine, and a vapor control valve disposed in the purge passage between the engine and the vapor canister, the vapor control valve having a housing including a main volume in selective fluid communication with an inlet volume and an outlet volume, the method comprising:

supplying a first electrical current to provide a heat source for a sensor and a second electrical current to determine changes in resistance of a sensing element of the sensor located in at least one of the main, inlet, or outlet volumes;

determining a hydrocarbon chemical content of the fuel vapor in at least one of the main, inlet or outlet volumes based on at least one of the first and second electrical currents; and controlling an electromagnetic actuator disposed in the housing of the vapor control valve based on the determined hydrocarbon chemical content.

21. The method of claim 20, wherein the locating comprises mounting the sensor contiguous to the main volume.

22. The method of claim 21, wherein the controlling comprises preventing a flow from the main volume to the outlet volume and determining the chemical content of the fuel vapor in the main volume.

23. The method of claim 22, wherein the controlling comprises flowing the fuel vapor to one of the intake and exhaust manifolds as a function of the magnitude of the chemical content sensed, the chemical content are hydrocarbons selected from a group comprising Butane, Hexane, Hexene, Benzene, Toluene, Dimethyl Pentane, Iso-Octane, Ethyl-Benzene, O-Xylene, Nonane, MTBE, and combinations thereof.

* * * * *